United States Patent [19]

Weggelaar

[11] Patent Number: 4,971,507
[45] Date of Patent: Nov. 20, 1990

[54] STORAGE SYSTEM FOR PALLETS

[75] Inventor: Franciscus G. A. Weggelaar, 's-Gravenhage, Netherlands

[73] Assignee: Magcon Beheer B.V., Netherlands

[21] Appl. No.: 277,144

[22] Filed: Nov. 29, 1988

[30] Foreign Application Priority Data

Nov. 30, 1987 [EP] European Pat. Off. ............ 87202371

[51] Int. Cl.[5] .......................... B65G 1/04; B66F 9/06; B66F 9/12
[52] U.S. Cl. .................... 414/279; 414/284; 414/608
[58] Field of Search ............... 414/279, 286, 282–284, 414/589, 590, 663–666, 669, 670, 672, 347, 608

[56] References Cited

U.S. PATENT DOCUMENTS

| 2,833,435 | 5/1958 | Levy | 414/664 X |
| 3,467,264 | 9/1969 | Armington et al. | 414/283 |
| 3,817,406 | 6/1974 | Sawada et al. | 414/279 |
| 3,848,755 | 11/1974 | Bussienne et al. | 414/279 |
| 3,978,995 | 9/1976 | Zollinger et al. | 414/279 |
| 3,984,019 | 10/1976 | Brudi et al. | 414/666 X |
| 4,046,267 | 9/1977 | Redelman et al. | 414/284 |
| 4,103,795 | 8/1978 | Miller | 414/347 X |
| 4,252,495 | 2/1981 | Cook | 414/347 X |
| 4,298,305 | 11/1981 | Neth | 414/608 X |
| 4,505,630 | 3/1985 | Kaschner et al. | 414/284 X |
| 4,588,346 | 5/1986 | Smith | 414/590 X |
| 4,636,131 | 1/1987 | Sinclair | 414/666 X |
| 4,643,628 | 2/1987 | Pini | 414/279 |
| 4,797,059 | 1/1989 | Karg et al. | 414/590 |

FOREIGN PATENT DOCUMENTS

| 891825 | 7/1949 | Fed. Rep. of Germany . |
| 1245857 | 7/1967 | Fed. Rep. of Germany . |
| 2239126 | 2/1974 | Fed. Rep. of Germany . |
| 2626108 | 6/1976 | Fed. Rep. of Germany ...... 414/283 |
| 1259649 | 11/1972 | United Kingdom . |
| 1429785 | 3/1976 | United Kingdom ............... 414/608 |
| 1553292 | 9/1979 | United Kingdom ............... 414/608 |
| 2052457 | 1/1981 | United Kingdom . |

Primary Examiner—David A. Bucci
Attorney, Agent, or Firm—Hurt, Richardson, Garner, Todd & Cadenhead

[57] ABSTRACT

Storage system for pallets, which is constructed from columns connected to one another by longitudinal and transverse girders. Channels for the storage of pallets are obtained in each compartment at different supporting levels. Mounted on the transverse girders in the longitudinal direction of each channel are rails on which a driven carriage can be moved through the channel in the longitudinal direction. The rails are mounted such that the wheel tracks are outside the dimension of the pallets. The carriage is equipped with wheel carrying arms at locations corresponding to the rail tracks and outside the pallet width and with a fork at such a height that the prongs can be inserted into the insertion orifices of the pallets.

12 Claims, 7 Drawing Sheets

FIG:1.

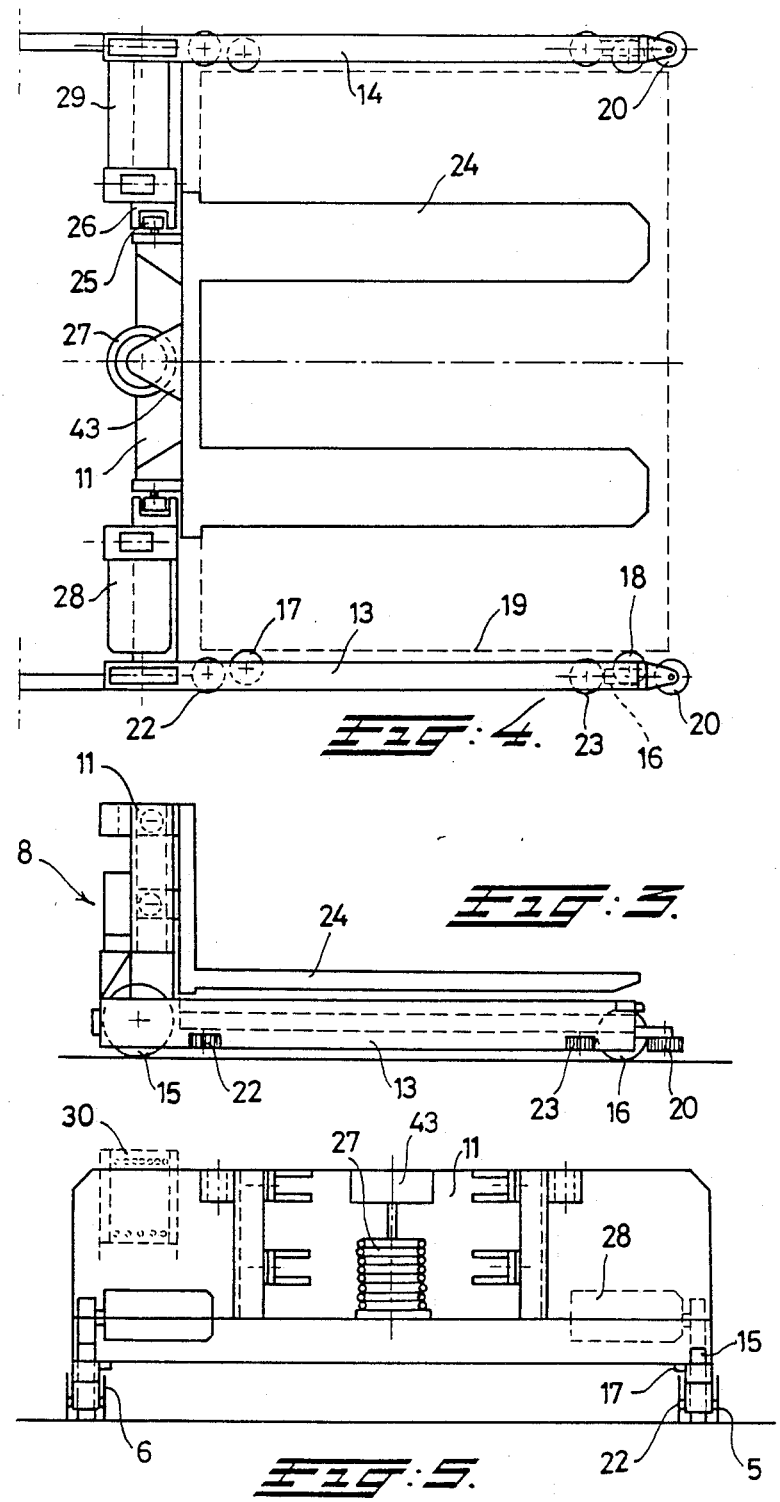

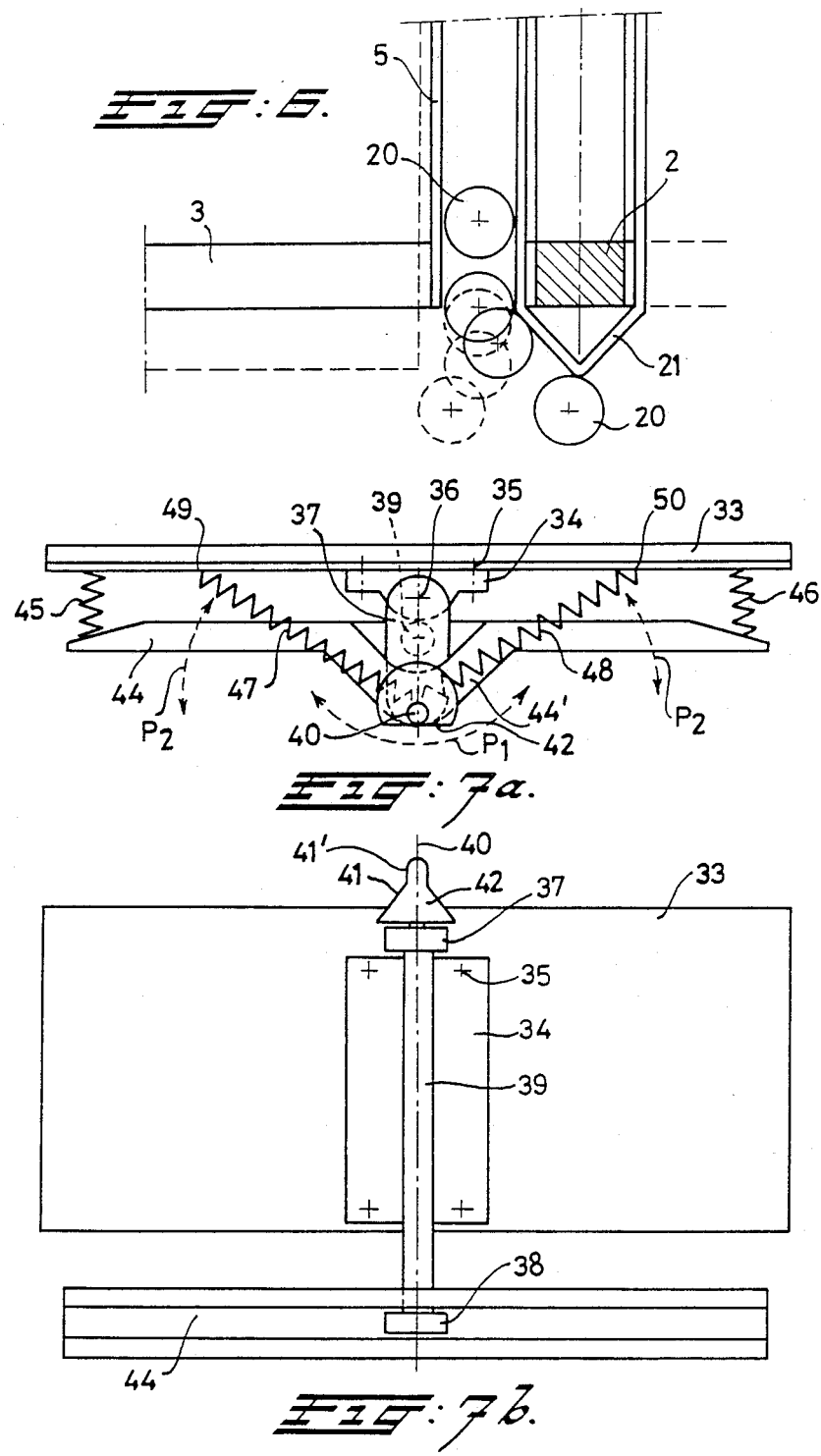

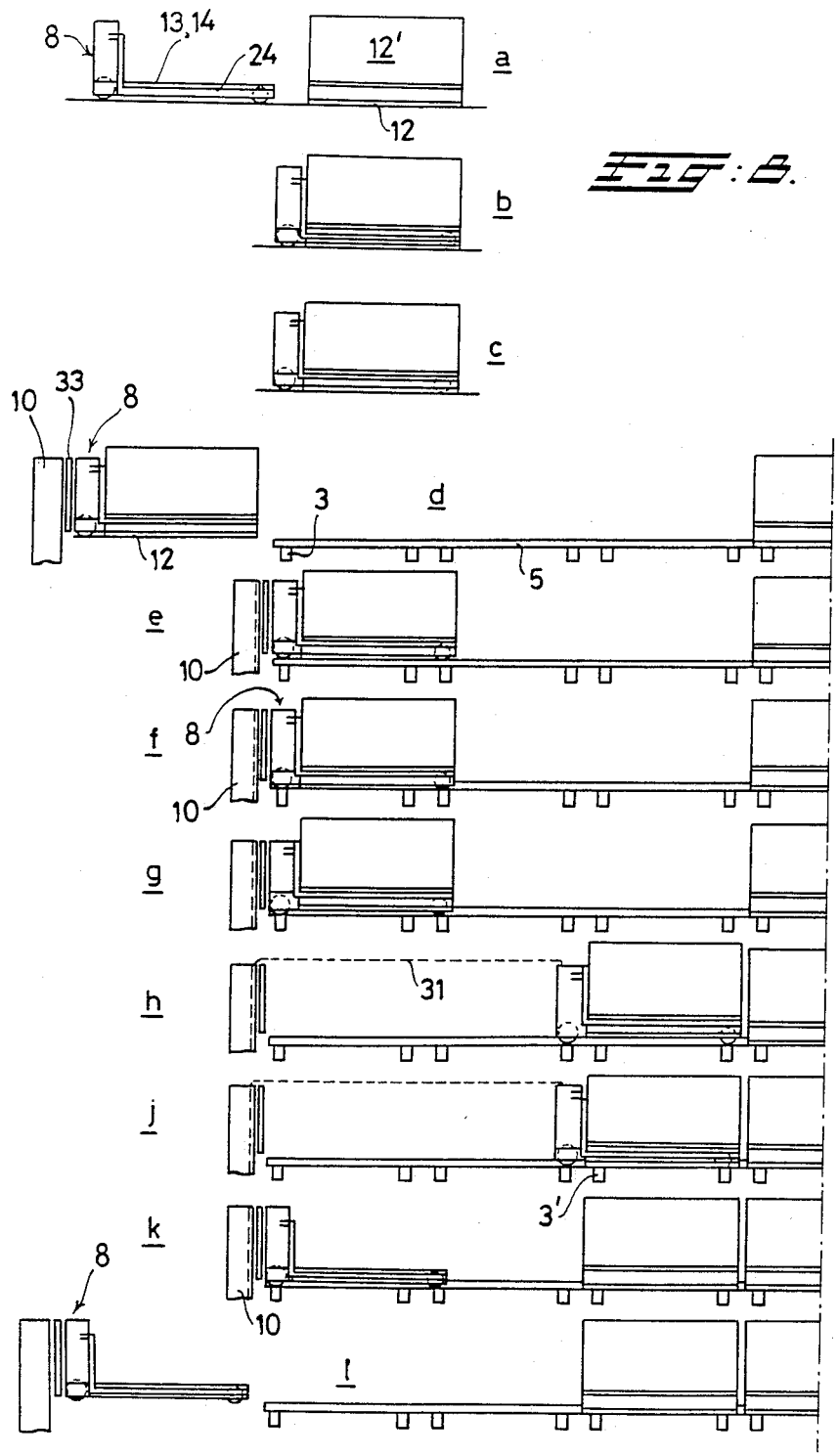

STORAGE SYSTEM FOR PALLETS

BACKGROUND OF THE INVENTION

1. Field of the Invention

The invention relates to a storage system for pallets, which comprises a pallet shelf with one or more carriages and a front transport device, the storage shelf being constructed from columns which are connected to one another by means of longitudinal and transverse girders, with the result that channels for pallet storage are obtained in each compartment at different supporting levels, and there being mounted on the transverse girders of the shelf in the longitudinal direction of each channel rails on which is movable through the channel in the longitudinal direction a carriage equipped with running rollers and with a drive for these, and which is equipped with devices for lifting a loaded pallet.

2. Description of Related Art

Various known storage systems come under this definition which corresponds to what is prior art. Before these prior art systems are discussed, however, some comments must be made to give a clear understanding of the storage conditions in systems with channel storage with regard to the system known as "serial shelving".

Serial shelves are constructed from columns which are interconnected substantially only by means of longitudinal girders. Between these there are storage compartments which are free of cross-connections, with the sole exception of the connections above the topmost stacking levels, since, of course, these connections are necessary for ensuring that the system as a whole has sufficient stability. However, in the compartments, the complete height of all stacking levels is freely accessible to a fork-lift truck equipped with an extendible mast, by means of which the pallets can always be set down on the desired level or lifted off from it. Although serial shelves are suitable both for the LIFO method and for the FIFO method, in the former case, of course, when there is an aisle on both sides of the compartment depth, the most important restriction is that they are suitable only when the number of pallets used to store the same article is large enough for an entire compartment to be provided for these; otherwise, the loss of filling capacity becomes too great. Storage and removal can be carried out only if each pallet location (the floor space above which pallets can be arranged at all levels) is filled up or cleared out completely in series. Finally, fork-lift trucks are not capable of extending their fork with regard to the mast sufficiently far to ensure that the latter reaches further than the first attainable pallet location, or at most, the second if a "reach truck" is used. If the number of pallets per article, on which the storage concept has to be based, is not so high, it is expedient to limit the channel depth. Two divisions can then be erected back-to-back with aisles on both sides, but this once again entails the restriction to the LIFO method, thus affecting the storage and removal sequence.

Series shelves also have other restrictions. The fork-lift truck always has to travel into and out of the complete free depth of each compartment with its loaded pallet. At the same time, the lateral clearance is in practice always limited to a few centimeters. The truck driver therefore has to move very carefully in order to avoid collisions with the shelf, and this means that the lifting vehicles alway work slowly.

There is also the aspect of danger. Although a fork-lift truck is generally not allowed to travel with the load in the lifted-up position because of the reduced stability which then arises, this is nevertheless unavoidable with series shelves. In particular, the pallets are set down on short girder pieces which, in relation to the columns or in relation to the longitudinal girders (on both), are projecting into the compartment over a short distance in the transverse direction. This distance, that is to say the length of these short sections, is of course chosen so that a pallet set down on them is always supported on both sides. It is thereby impossible to lift a pallet inside the compartment. As a result, the pallet has to be lifted in the aisle to a short distance above the intended level, whilst the lifting vehicle in this condition has to enter the particular compartment to its full depth. It is clear that when work is carried out at higher levels, increasing accuracy is necessary when working with the lifting vehicle, and once again this has an adverse effect on the working speed.

Finally, with series shelves there is also the problem that there are many types of lifting trucks, of which the width at the top is too great to fit with sufficient clearance between the supporting girders. This problem can be avoided only by arranging the second level so high that the lifting vehicle fits under the girders. Space is thereby wasted above the lowest level (where the pallets are put down on the floor). The alternative is to be restricted in the choice of the type of lifting truck, specifically to those which are so low that the second level can be arranged, at such height as determined by the dimensions of the loaded pallets, without loss of space.

Mainly in view of these considerations in respect of series shelves, there is a need for systems in which work can be carried out in channels, specifically at a working speed which is not restricted by maneuvering problems inside the compartments. The term "channel" or "tunnel" then refers to the entire space available at the same level over the full depth of a compartment between the rows of columns, and where appropriate the distance between these rows of columns can be chosen to be so great that there is room for two channels located next to one another on the same level.

A system of this type is known as defined in the first paragraph above relates, in which a carriage can travel completely underneath the pallets in the rails. For this purpose, the pallets stand on the rails and the rails are designed as horizontal U-sections, the wheels of the carriage moving within this U-shape. Mounted within the height of the carriage, i.e. also within the height of the horizontal U-section, is, in addition to a drive, a lifting mechanism for a table which is essentially exactly as large as the carriage itself and by means of which a pallet can be lifted until it comes free of the rail and can be shifted by means of the carriage.

Two alternative versions of a front transport device are proposed. One is a hoist within the space of a pallet location in the shelf, which interacts with a distributor carriage at each level outside the shelf, with the result that a pallet can be brought to this level in front of the respective channel. The actual channel carriage ensures that the gap relative to the rails in the shelf is bridged. The other alternative version is a mast which is equipped with a lifting table and which moves in a rail relative to the floor. This lifting table too has to bridge a gap relative to the rails in each channel.

The carriage travelling in the channels are independent; a computer-controlled locating and storing system is provided. The hoist and distributor carriage in the first version and the travelling column with the lifting table in the other version are also controlled in this way.

A consideration problem of these systems, which are also known as satellite systems, is that the height of the rails or of the carriage within the system as a whole constitutes a loss factor which is repeated for each level. Furthermore, to ensure the desired independence, each carriage contains its own battery. This too constitutes a factor which increases the costs considerably.

This prior art storage system is very expensive for various reasons. The shelf construction is a special, heavy construction, the automatic control system which has to work with a high degree of accuracy also entails high basic costs. In practice, then, the system can be used ecomonically for very large stores only, mainly in manufacturing plants. It is pointed out, for the sake of completeness, that the system allows the use of both the FIFO method and the LIFO method for storage and removal.

Through-type shelves and running-pallet shelves are also known. The former are equipped with roller tables both in a non-driven version and in a driven version. These allow only the FIFO method, and therefore, space is required for an aisle both at the front and at the rear. Roller tables are somewhat expensive, and this is even more true of driven roller tables. If they are not driven, there are considerable restrictions as regard use (gradients, load stability, pallet design, channel length, dynamic pressure, etc.) which, moreover, partly apply also to the driven versions.

The running-pallet shelves have rails extending in the longitudinal direction of the channels, but a movable underframe is necessary for each pallet. Although there is the choice of setting a standard pallet down on such an underframe or stacking the load directly on a special pallet equipped with wheels, it is clear, nevertheless, that both are cumbersome and at all events result in a very expensive system.

Through-type shelves and running-pallet shelves certainly both have the advantage that the work can be carried out more quickly, because, after the pallet has been set down, it is not necessary to wait until the pallet has reached its location in the stores. These systems can be advantageous particularly for fields where a large number of pallets have to be handled daily.

SUMMARY OF THE INVENTION

The primary object of the invention, starting from the storage system defined in the first paragraph above and having storage in channels, is to achieve greater flexibility of use. This means especially also economical practicability for a smaller overall size of the system.

Further objects are to realize this at a low price and to avoid the disadvantage which is so aggraviating where series shelves are concerned: the slow handling as a result of the required exact maneuvering.

Furthermore, the system should suitable both for the FIFO method and for the LIFO method of storage and removal.

The problems listed above in connection with through-type shelves and running pallet shelves should likewise be avoided.

All this should be achieved, without the system resulting in a loss of space comparison with the space which must always remain free on all sides for the storage of pallets in shelves because of projection of the load.

According to the basic idea of the invention, in the storage system the wheel bearing surface of the rails are mounted outside the dimension of the pallets for which the channel is provided, the carriage has its wheel carrying arms outside the pallet width at the locations corresponding to the wheel bearing surfaces of the rails, has a superstructure at one end and is equipped with a fork at such a height that the prongs of this fork are insertable into the insertion orifices of the pallets, whilst means are attached to the superstructure, to the effect that the pallet can be raised and lowered by means of the fork over a height which is sufficient to keep pallet and load free from the parts of the shelf during the shift of the carriage in the channel.

The rails or at least the wheel tracks thereof are thus accommodated outside the pallet width within the space which is always kept free on both sides of the pallets. The pallets then stand between the rails. The rails therefore require no increase in the space per level. There is no need to accommodate a substantial part of the carriage under the pallet. A fork is used on a type which is customary per se, whilst the arms and the fork are fastened to a superstructure which also carries the motor the like and which, during the shift of each pallet, is located outside the pallet space, but never permanently takes up storage space.

In terms of manufacturing cost and also the flexibility with regard to the overall size of the system used, the most important factor is that the system according to the invention can be set up simply if what is known as normal pallet shelves is taken as the starting point. Basically, no arrangements need be made other than to mount the rails above the transverse girders of these pallet shelves. Some important advantages for series shelves arise as a result. In particular, normal pallet shelves are cheaper than series shelves, because, coupled to one another, they constitute a highly stable entity. There is no need for special anchoring structures for bracing or for fixing to the floor. If normal pallet shelves are also used, fewer columns are also required, because two pallets of a length of 120 cm per compartment can be accommodated between adjacent rows of columns, whereas with series shelves one pallet can only ever be accommodated in a compartment between adjacent rows of columns. In series shelves, the pallets rest with the sides on the shelf girders. The support provided for the pallets then sometimes leaves much to be desired, particularly with regard to pallets of 100×120 cm, when these are stacked with the 100 cm in the direction of depth. Since, in the invention, normal pallet shelves with complete transverse girders between the rows of columns can be used, the pallets are supported perfectly by these transverse girders.

Because, as already mentioned, two pallets can be accommodated in one compartment when normal pallet shelves are used, the advantage for series shelves that a space of approximately 10 cm is gained per pallet width is also achieved. In terms of the total size of the system, this amounts to approximately 8%.

When series shelves are used, the channels must be sufficiently wide for the introduction of a fork-lift truck. The pallets can therefore be stacked in virtually no way other than with a length of 120 cm in the transverse direction of the channel. However, when normal pallet shelves are used, there is also the possibility of stacking pallets of 80×120 cm with the 120 cm in the direction of depth of the channel and the 80 cm in the transverse direction.

When two pallets are accommodated in one compartment, according to the invention it is sufficient to mount three rails; the middle one is located in the gap between the pallets and can be used for the two channels in this compartment. If three channels are formed within the compartment for the pallet dimension of 80 cm, four rails altogether are sufficient, according to the same principle of using all inner rails for the two adjacent channels.

The problem of series shelves, according to which height can be lost on the lowest level as a result of the entry of the fork-lift truck, no longer applies here. According to the invention, the lifting vehicle remains in the aisle, so that even the lowest level, namely with the pallets standing on the floor, can have the same minimum height as the higher levels. The rails are fastened directly to the floor next to the pallet locations.

Alternatively one may realize the idea of reducing the number of columns by reducing the numer in each row of columns, so that either girders and rails, or the rails only, having appropriated dimensions, will bridge the spacing between the columns. Particularly in this way an optimum ratio between strength and price can be calculated.

From the point of view of these considerations, the system according to the invention not only represents an improvement of the existing systems, storage in channels being possible, but the advantages are of such nature, even in terms of systems of series shelves, that in many cases they can replace these series shelves. In particular, in the system according to the invention, safety is no longer put at risk because a fork-lift truck travels with a raised load, this being unavoidable with series shelves when the truck is occupied with working in the higher channels.

Another advantage of the system according to the invention results from the fact that a side-off loading fork-lift truck can also be used. The aisles can thereby be kept narrower and benefit can be gained from a greater stacking height.

The invention is explained below with reference to the accompanying drawings of an embodiment.

SHORT DESCRIPTION OF THE DRAWINGS

FIG. 1a shows diagrammatically an alternative embodiment of the present invention with three compartments per level;

FIGS. 3, 4 and 5 show respectively a side view, a top view and a rear view of a carriage;

FIG. 6 shows a detail on a larger scale, specifically as a partial horizontal section through a girder with the start of a running rail;

FIGS. 7a and 7b show on a different scale, in top view and in elevation, respectively, a system for coupling the carriage to the fork board of a fork-lift truck;

FIG. 8 shows diagrammatically the various steps of the procedure for storing and removing a pallet in the shelf by means of the system according to the invention;

Figure 9A:
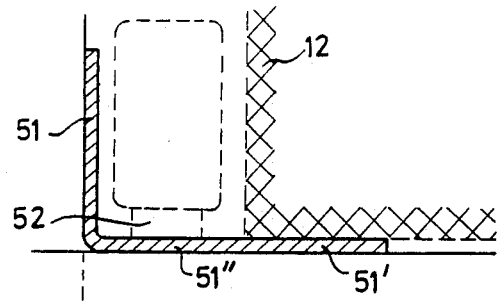
Figure 9B:
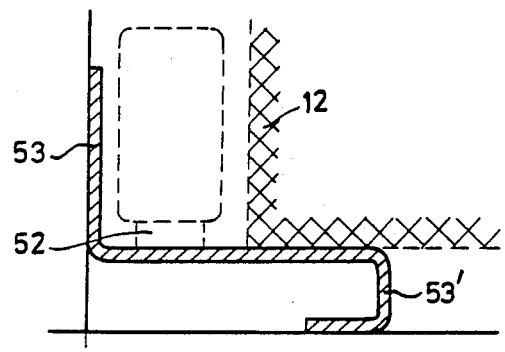
Figure 9C:
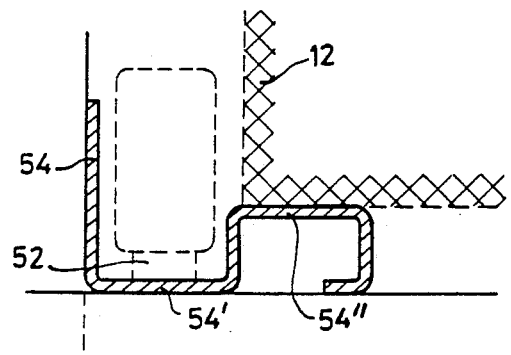

FIG. 9a–c shows diagrammatically three alternative embodiments of the rails on which the carriage moves.

DESCRIPTION OF THE PREFERRED EMBODIMENTS

Figure 1:
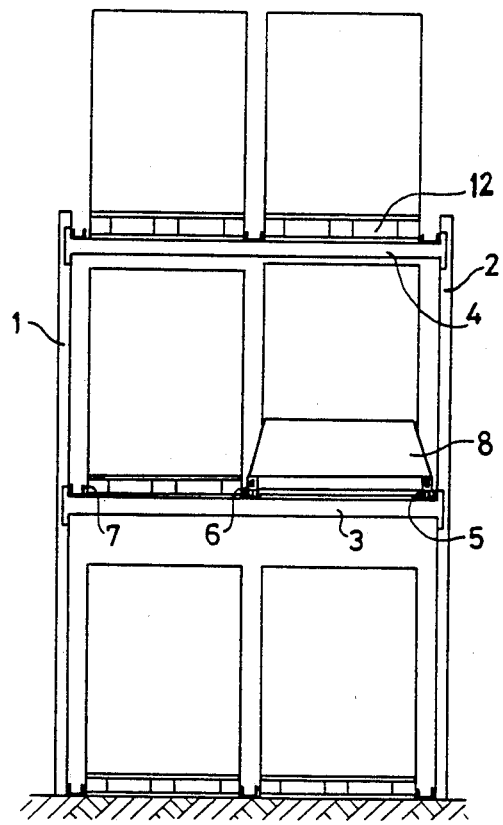
FIG. 1 shows diagrammatically a front view of a compartment in shelf in one embodiment of the invention.

FIG. 1 shows a front view of an individual shelf compartment. The foremost specimens 1 and 2 of two rows of columns can be seen. They are interconnected by means of rows of transverse girders, of which the foremost are designated by 3 and 4 in FIG. 1. Because pallets can also be put down on the floor in the usual way, three channels above one another are thus obtained. The drawing shows a version, in which the distance between the rows of columns has been chosen so that two pallets can be accommodated next to one another in each compartment, thus providing two storage channels per compartment width.

Three rails 5, 6, 7 are mounted in each compartment over the full depth of the compartment. These rails rest on the transverse girders such as 3. With regard to the basic concept of the invention, it makes no difference whether the shelves are constructed with separate longitudinal girders—in the direction of depth of the compartments or channels—and with rails or whether the rails according to the invention have such dimensions that they can perform the function of longitudinal girders, as will be discussed in detail below.

FIG. 1 shows a carriage 8 in the right-hand channel on the second level. It can be seen from FIG. 1 that this carriage runs in the rails 5 and 6 by means of its wheels, and that the rails are located outside the dimension of the pallet. When the left-hand channel in the same compartment has to be served, the carriage makes use of the same middle rails together with the rail 7.

It is also evident from FIG. 1 that the pallets 12 stand on the transverse girders 3 between the rails.

Figure 2:
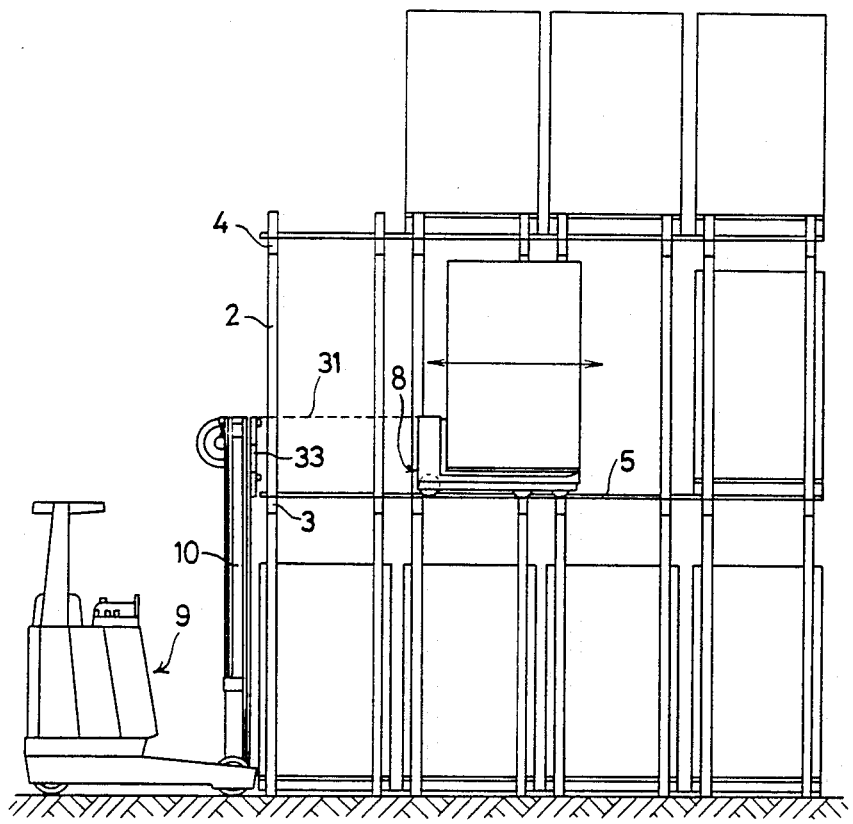
FIG. 2 shows an associated diagrammatic longitudinal section, that is to say a section in the direction of depth of the channels.

FIG. 2 shows a diagrammatic vertical section through the shelf in the longitudinal direction, that is to say the direction of depth of the compartments and channels. According to the representation of FIG. 1, the carriage 8 is occupied with introducing or extracting a pallet on the second level, whilst the channel on the first level is completely filled and the channel on the third level still has an available pallet location. The front transport device shown is a fork-lift truck 9, the lifting arm 10 of which has been raised into a position in which work can be carried out on the second level.

FIG. 3 shows a side view, FIG. 4 a plan view and FIG. 5 a rear view of the carriage 8. Two wheel carrying arms 13 and 14 are fastened to the superstructure 11. Each arm contains bearings (not visible) for a driven rear wheel 15 and for driven front wheel 16. The carriage thus runs in the rails 5 and 6 which are shown in full in FIG. 5, but not in FIGS. 3 and 4.

Because, according to the concept of the invention, the arms 13, 14 are located next to the pallet, it is important to ensure the guidance of these arms in relation to the pallet. For this, FIG. 4 shows two horizontal guide rollers 17 and 18 on the arm at the rear and at the front respectively. A rectangle marked by broken lines indicates the location of the pallet, and the rollers 17, 18 can then also be seen located on the side 19 of the pallet. When the carriage approaches the pallet while the latter is still standing on the floor, the arms can consequently engage firmly round the pallet. The rear view of FIG. 5 shows the position of the guide rollers in terms of height, since the rearmost roller 17 can be seen there; of course, these pallet guide rollers must be located above the rails. FIGS. 3 and 4 also show that a further guide roller 20 is mounted at the ends of each of the two arms.

These rollers serve for guidance when the carriage is fitted into the rails. For this, attention is drawn to the detail of FIG. 6. This illustrates the preferred measure according to the invention, whereby a symmetrically oblique introduction piece 21 is attached to the front sides of the columns. For a diagrammatic representation of the aligning operation during introduction, different positions of a guide roller 20 at the end of a arm are shown. The fork-lift truck need be maneuvered only so that the roller 20 comes up against the correct oblique face of the introduction piece 21; thereafter, the roller 20 will ensure further guidance into the rail 5. It is clear that such guidance on one side is sufficient; the middle rails 6 in each compartment need not be equipped with an introduction guide of this type; it is sufficient if the carriage can be pressed with its arm on one side or the other against an introduction piece attached to a column.

FIG. 4 shows that each of the arms of the carriage is also equipped with two guide rollers 22, 23. As emerges from FIG. 3, these rollers are located at the same height as the introduction guide roller 20. As shown in FIG. 5 where the roller 22 can be seen, the rollers 22 and 23 must be located within the rails for the transverse guidance of the carriage, because the rollers fit exactly within the rail width.

FIG. 4 shows that the superstructure 11 carries a fork 24 which, when a lifting motor 27 is activated, is movable vertically within C-sections 26 by means of rollers 25. As also emerges from the side view of FIG. 3, the prongs of the fork 24 are at such a height and of such a width that they can be inserted into the normal insertion orifices of a pallet, specifically both on the long side and on the short side. By means of position switches or similar means understandable to a person skilled in the art, three vertical positions are provided on the fork 24, namely a low and a high position and an intermediate position for a purpose explained in more detail later.

To complete the description of the carriage, there are two electric motors 28, 29 which each drive one of the driving wheels 15. There is then a cable reel 30 for an electrical cable 31 (see FIG. 2), which serves both for the power supply by means of a connection between the electric motors 28 and 29 and the battery on the fork-lift truck 9 and for transmitting the control signals. The carriage is also equipped, insofar as this fits into the control system selected, with signalling means (not shown) for the approach of the end of a free path, and these means can be mounted on the moving arms 13, 14 at the front.

For the mechanical connection between the carriage and the fork board 33 (see FIG. 2) of the fork-lift truck, a possible solution is shown in FIG. 7a and 7b. A mounting plate 34 can be affixed e.g. by boths such as 35 to the fork board 33. Mounting plate 34 carries two bearings, not visible, having a common, vertical axis 36 to pivotally support an upper and a lower link 37, 38 respectively. Links 37, 38 are rigidly interconnected by a rod 39 so that they swing together about axis 36.

Near the other ends, links 37, 38 each carry another bearing, also not visible, having a common, vertical axis 40. The bearing in upper link 37 is used to rotatably support a peg 41, comprising a conical body, part of which has been removed along a plane 42 parallel to the cone axis, coinciding with the axis of rotation 40. On top of the cone and integral therewith, is a pin 41' presenting a rounded tip. Peg 41 has a locating function and therefore, is adapted to cooperate with a cavity of corresponding shape, not visible, in a piece 43 (see FIG. 4), said cavity being open at the bottom face of piece 43.

The bearing in the lower link 38 is used to pivotally support a horizontal beam 44, formed with a bulging central part 44' through which the pivot axis 40 passes, the remainder on either side extending parallel to and more close to fork board 33. In the condition in which carriage 8, with a pallet thereon, is supported by peg 41, the rear lower part of carriage 8 simply rests against beam 44.

The structure is completed by a pair of spring members, indicated diagrammatically at 45, 46, between the ends of beam 44 and fork board 33, which spring members, in the absence of other forces, will keep beam 44 parallel to the fork board, and by a pair of spring members 47, 48 between a point of the other link 37 (or the lower link 38) close to pivot axis 40 and points 49, 50 of the fork board 33 sufficiently far on either side of the center, so that in the absence of other forces spring members 47, 48 will keep links 37, 38 in the central position perpendicularly to the plane of the fork board.

With such a structure, with enables the carriage 8 to swing and pivot relative to the fork board 33 as indicated by the double-headed arrow P1 and the two double-headed arrows P2, respectively, the carriage will find its way into a channel while allowing practical alignment margins, both in angle and in position, of the truck with respect to the channel.

The coupling can also be implemented in a kinematically reversed manner.

Although the structure described in connection with FIGS. 7a, 7b is particularly useful in connection with the system of the invention, because this invention requires a greater precision in placing the carriage than the precision which is usually required when placing a pallet in a shelf, the coupling structure can also be used with other shelf systems because it will always allow for an increased working speed in depositing and removing the pallets.

When the carriage rests on the floor or the rail and the fork board of the fork-lift truck decends, the carriage is uncoupled. When the fork-lift truck has reached the position shown in FIG. 2, the carriage 8 can be uncoupled in this way in order thereupon to cause it to move out as a result of control from the control desk on the lifting vehicle 9 and into the channel via the signal lines in the assembled cable 31.

FIG. 8 shows diagrammatically the various steps of the procedure for storing a pallet and for removing this pallet from storage.

(a) A pallet 12 to be stored together with the load 12' stands on the floor together with the carriage 8. The fork 24 is in the lowest position, indicated by a marking on the superstructure.

(b) The carriage has been introduced by means of the fork 24 into the insertion orifice of the pallet, the arms 13, 14 engaging round the sides of the pallets.

(c) The fork is raised to the middle position, so that the weight of the loaded pallet rests on the fork or the carriage.

(d) The carriage, together with the loaded pallet resting on it, after being coupled to the fork board 33 at the end of the mast 10 of the lifting vehicle, is lifted as a result of the extension of this mast 10 to the level at which the pallet has to be stored. The pallet is thus located in front of the rails 5 which belong to the respective channel.

(e) The fork-lift truck moves forward, so that, by using the locating movement illustrated and described in FIG. 6, the moving arms 13, 14 enter the rails and the pallet is level with the first pallet location in the channel. At this moment, only the lateral guide wheels 22, 23 (FIGS. 3 and 4) function; the running wheels 15, 16 do not yet stand on the rails.

(f) As a result of the downward movement of the lifting arm 10 of the fork-lift truck, the carriage 8, together with the loaded pallet located on it, is brought down until the running wheels 15, 16 of the carriage stand on the base surface of the rails.

(g) The fork 24 is brought into the highest position, with the result that it takes over the entire weight of the loaded pallet and lifts the pallet sufficiently high relative to the transverse girders 3 to make it possible to move, without the possibly sagging lead touching the transverse girders. The column 10 is moved down until the carriage 8 is uncoupled. The carriage is now ready to move away.

(h) The carriage has been introduced into the channel as a result of control via the unwound cable 31 and has reached the location farthest away.

(j) The fork 24 of the carriage is brought into its lowest position, with the result that the loaded pallet is set down on the transverse girders 3'. The carriage is ready to move back.

(k) The carriage has moved back to the first location in the channel and is coupled again by raising the lifting arm 10 of the lifting vehicle over the necessary distance.

(l) The fork-lift truck has moved back and has removed the carriage completely from the channel. The carriage can be returned to the floor for receiving the pallet.

For removal from the store, the same actions take place in reverse order.

If there is only one free location left in a channel—namely the location which was designated above as the first pallet location in a channel, but of course is basically the last location during the filling of the channel—the steps (g) and (k) relating to the movement of the carriage into and out of the channel are omitted; after step (f), steps (h) and (j) and then step (l) are executed.

The embodiment of the shelf depicted in FIGS. 1 and 2 has the rows of columns arranged with such spacing in transverse direction—still referring to the channels—that two pallets of 120 cm, or even three of 80 cm can be accommodated in one compartment as can be seen in FIG. 1a. There is an alternative—which is known in itself with series shelves—i.e. to give the rows of columns a spacing adapted for one pallet, but to arrange the columns in each row at a certain distance. This means that structural strength and stiffness in lengthwise direction of the rows—or the direction of the depth of the channels, for the matter—must be provided for by other means. This can be realized by appropriate dimensions of the rails such as 5.

Looking again at FIG. 2 it is visible that columns are combined pairwise, so as to constitute frames, having a dimension in lengthwise direction of the rows or channels such that one frame corresponds with one pallet place. It is feasible to omit every other frame and even to give the remaining frames a mutual distance exceeding the size of one pallet place. The rails such as 5 would bridge the gaps in the structure. The advantage is, as will be clear, a considerable saving in material, and therefore a lower price of manufacture.

Since the girders such as 3 are to be carried by the columns, there would no longer be support for those pallet places situated between the column frames. In view of this, the invention proposes a few variations, depicted in FIGS. 9a, 9b and 9c. The rails would not have a U-shaped profile such as in the embodiment described so far. With a simple angle steel 51 as the rail, as depicted in FIG. 9a, the pallets 12 will no longer need girders but can be put down on flange 51' of angle steel 51. In this embodiment it is no longer the complete rails which lies beside—i.e. outside the width of—the pallets, but only the wheel tracks or wheel bearing surface parts 51" of the angle steel 51. Of course the cross-sectional dimensions of angle steel 51 must have been so chosen that the stiffness and strength are sufficient to support the weight of the load where the rail bridges the spacing between column frames. In addition a special wheel track strip 52 may be provided in order to prevent wear and tear of the rails.

The variation shown in FIG. 9b, where the rail is a section 53 with an added gutter shaped edge 53', presents the advantage of a more favorable ratio between stiffness and cross-sectional area of the material. This holds to a larger degree yet for section 54 in FIG. 9c, and moreover the wheel bearing part 54' is lower than the pallet supporting part 54", so that the wheel axis and the wheel motor may be arranged lower on the carriage.

With the idea depicted in FIGS. 9a-c, pallets of standard size 80×120 cm can now also be stored in a regular shelf, because its 120 dimension will always find support on the rails. The additional advantage with this type of pallets is that the pallets will now be properly supported, because the wooden planks extend parallel to the 120 dimension.

What is claimed is:

1. A storage system for storing pallets comprising:
   a pallet shelf having at least a first row and a second row of spaced apart substantially vertical columns, a plurality of transverse girders interconnecting adjacent columns in each row at selected points along each column, a plurality of longitudinal girders interconnecting said columns at said selected points, the interconnection of the columns by the transverse and longitudinal girders defining compartments between the rows of columns,
   a plurality of rails mounted on the transverse girders substantially parallel to the longitudinal girders, the rails having wheel bearing surfaces and defining at least one channel within said compartments in the longitudinal direction thereof;
   a carriage having two wheel carrying arms spaced apart from each other by substantially the distance between rails, the wheel carrying arms having running rollers for moving along the wheel bearing surfaces of the rails, a drive powering the running rollers, a superstructure mounted to the wheel carrying arms, a fork for insertion into pallet orifices the fork mounted to the superstructure between the wheel carrying arms, and means for lifting the fork while bearing a loaded pallet; and
   a front transport device for lifting and transporting the carriage.

2. The system of claim 1 wherein the front transport device comprises a lifting truck having a mast, a fork board, and a means for slidably attaching the forkboard to the mast.

3. The system of claim 2 further comprising a mechanism for connecting the fork to the fork board having an element mounting to the fork board, a link pivotally attached to the element, and a peg affixed to the link for coupling with the fork.

4. The system of claim 2 wherein the carriage further comprises a coupling means adjoining the superstructure for coupling the carriage to the fork board.

5. The system of claim 4 wherein the coupling means further comprises an element for mounting to the fork board, a link pivotally attached to the element, and a support piece affixed to the link for supporting the carriage.

6. The system of claim 1 wherein adjacent columns in the rows of the pallet shelf are spaced at double given dimensions of the pallets, and three rails are mounted in each compartment, wherein the three rails define two channels, and the middle rail is used by the carriage when in either channel.

7. The system of claim 1 wherein adjacent columns in the rows of the pallet shelf are spaced at double a pallet length, and four rails are mounted in each compartment, the rails forming three channels wherein pallets can be stored within each channel in a direction of their width and rails common to adjacent compartments may be used by the carriage when in either of the adjacent compartments.

8. The system of claim 1 wherein the means for lifting includes three setting positions for setting the fork in a high position, a low position and an intermediate position relative to the carriage.

9. The system of claim 1 wherein the wheel carrying arms are equipped with locating rollers for introduction into the rails.

10. The system of claim 9 wherein each of the columns is equipped on the front side thereof with an introduction piece having oblique guide faces relative the rails located on both sides.

11. The system of claim 1 wherein the wheel carrying arms are equipped with guide rollers for guiding the pallets onto the fork.

12. The system of claim 1 further comprising an electrical driving means and a cable connection connecting the electrical driving means to the front transport device.

* * * * *